Feb. 24, 1948.                P. H. WALTHER                2,436,535
                              GRINDING MACHINE
                           Filed June 28, 1944
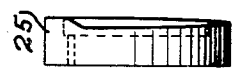
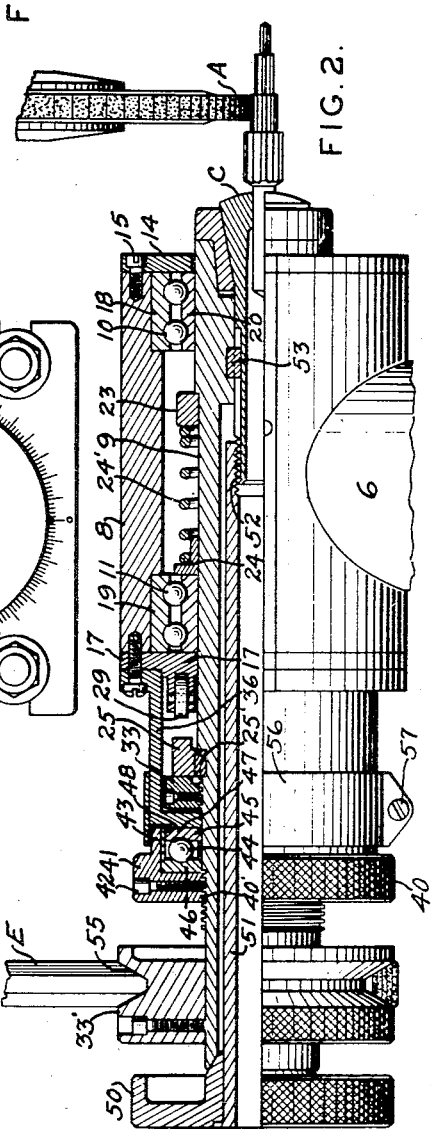
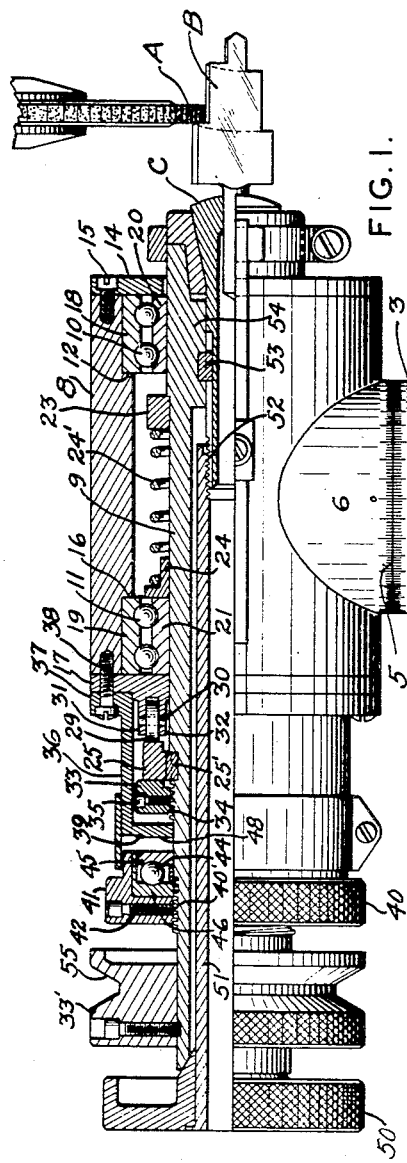
INVENTOR
PAUL H. WALTHER
BY
George R. Erickson
ATTORNEY Patented Feb. 24, 1948

2,436,535

UNITED STATES PATENT OFFICE 2,436,535

GRINDING MACHINE

Paul H. Walther, St. Louis, Mo., assignor to Carter Carburetor Corporation, St. Louis, Mo., a corporation of Delaware Application June 28, 1944, Serial No. 542,478

5 Claims. (Cl. 51—232)

This invention relates particularly to improvements in machines for grinding tools and more specifically to a work holder for use in grinding operations wherein the parts are so constructed and arranged that both back-off and center grinding operations are practical by relatively slight adjustments of the parts forming the assembly.

One of the objects of this invention is to form the parts of the device so that transition is not only quickly performed but this operation can be accomplished with necessary accuracy and efficiency and without possibility of unintentional movement of the various parts interfering with such operation.

Another object resides in the provision of a construction whereby the adaptability of the device to any suitable base and with any desired angular adjustment is practical.

Another object is to so mount the assembly that a maximum number of parts, including bearings are completely housed during all operations.

Other objects will more clearly hereinafter appear by reference to the accompanying drawings forming a part of this specification, and wherein like characters of reference designate corresponding parts in which Fig. 1 is a quarter section of the device as used for back-off grinding.

Fig. 2 is a similar view of the device used for center grinding, and

Fig. 3 is a side elevation of the adjusting cam.

While any suitable support may be used, there is illustrated in the present disclosure a base plate 1 having bolt openings whereby it may be bolted by bolts 2 to any machine or standard. This base plate is vertically positioned to form the lower section of a swivel support, completed by intermediate member 3 rotatable on central connecting bolt 4 and having the horizontal surface 5, suitably graduated for adjustment and upon which is mounted the top supporting element 6 movable about pivot bolt 7 on the horizontal supporting surface 5. The supporting elements 6 include the cylindrical housing 8 in which are arranged the bearings for alignment and rotation of the spindle 9. The spindle 9 is mounted within the bearings 10 and 11 seated at the front and rear ends of the cylindrical housing 8 and is freely rotatable at all times within these bearings. The front bearing 10 is confined between the annular shoulder 12 of the housing and the retaining closure plate 14 fixed at the end of the housing by screws or bolts 15.

The rear bearing 11 is confined between the annular shoulder 16 of the housing and the rear closure plate 17 of the housing. The outer races 18 and 19 of the bearing assemblies are thus fixed in the housing 8 and the inner races 20 and 21 are mounted upon and permit free longitudinal sliding movement of the spindle 9. To urge the spindle toward an extended position with respect to the housing there is provided a fixed collar 23 on the spindle 8 and a stop collar 24 abutting against the inner race 21 of the inner bearing and between which a coiled spring 24' is positioned. This spring normally urges cam 25 on the spindle against roller bearing 29 carried by the housings, as will more clearly hereinafter appear.

For use in a manual back-off operation where it is essential that the spindle be reciprocated axially and in a direction transverse to the peripheral surface of the rotating grinder A, the cam 25 fixed on the spindle by key 25' cooperates with the bearing roller 29 on the pin 30 mounted between the spaced walls 31 and 32 projecting from the rear face of the end plate 17. Roller 29 is positioned so that its axis intersects the axis of the spindle and thus the distribution of the thrust from the cam is properly distributed to eliminate wear of the moving parts. The cam is removable over the left end of the spindle and, in its working position, is backed by a threaded collar 33.

With the parts as illustrated in Fig. 1 it will be apparent that oscillation or rotation of the spindle by manual engagement with the knurled pulley 33' will cause the cam 25 to move the spindle axially of the housing and thus move the work piece B across the peripheral face of the rotary grinding wheel A. As the rise of the cam diminishes the spring will cause the outward movement of the spindle 9 to the limit defined by the setting of the collar 25.

Rearwardly extending from the cylindrical housing 8 is the housing section 36 enclosing the roller 29, cam 25 and collar 33. This housing section is essentially cylindrical in form, and of less diameter than the main housing 8 to snugly encase the parts mentioned. The outer end of the housing section 36 is flanged radially outwardly at 37 to provide for the passage of screws or bolts 38 which have the dual function of fastening the rear end wall 17 and housing section 36 to the end portion of the main housing 8. The inner end of the housing section 36 is flanged radially inwardly at 39 to snugly enclose the spindle 9 and the length of this housing section is such as to permit maximum movement therein of the adjustable collar 33 so as to permit disengagement of the cam 25 and roller 29 as shown in Fig. 2.

The collar 40 threaded on the spindle 9 at 40', includes the outer knurled body portion 41 through which the set screw 42 extends for locking same in its adjusted position on the spindle 9 and the forwardly extending cylindrical portion 43 which defines a recess in which are located the thrust ball bearings 44 enclosed by raceways 45 and 46. Left hand raceway 46 seats against the adjacent inner vertical face of the recess while right hand raceway 45 projects slightly outwardly of the end of cylindrical portion 43 for direct contact with the adjacent face 48 of flange 39, on housing section 36. By this arrangement adjustment of the collar 40 rightwardly on the spindle 9 will cause the projecting face of the raceway 45 to abut housing flange 39 and urge the spindle leftwardly relative to the housings, against the tension of spring 24', to cause suitable separation between the cam 25 and the collar 29 and thus render ineffective the cam action on the spindle. With the parts in the relative positions just described it will be apparent that application of power to the pulley 33' by means of belt E will result in the rotation of the spindle 9 independent of any axial movement of this part.

In use of the device as a back-off grinder, and with particular reference to Figure 1, it will be apparent to one skilled in the art that the work B, which may for instance be a stepped machine tool, is initially clamped in the expansible chuck C by manipulation of the hand nut 50. The rotation of the hand nut 50 and hollow stem 51 to which the nut 50 is fixed, urges the chuck C axially because of the threaded connection 52 between the stem 51 and chuck C. A spline 53 interposed between the chuck C and the inner face of the thickened wall portion 54 of the spindle 9 prevents rotation of the chuck during this adjustment and by the aid of spring 24' insures rotation of the work during operation of the spindle. When the work piece is chucked and a back-off operation is desirable, the drive belt normally operating in the groove 55 of the combined pulley and hand wheel 33' is disengaged and the hand wheel turned through the required arc manually to cause axial movement of the work B across the peripheral rotating face of the grinder A. This operation being carried out to the extent desired and through cooperation of roller 29, cam 25 and spring 24', results in an accurate grinding operation within the predetermined limits permitted by the rise of cam 25 and its adjustment on the spindle.

In center grinding the hand nut 40 is unlocked by disengaging screw 42 from the spindle and is then adjusted rightwardly by clockwise turning on threads 40'. Thereupon the bearing race 45 engages the flange 39 of the housing 36 and urges the spindle leftwardly within the housings until the roller 29 is entirely free from contact with the high point of the cam collar 25. This obviously frees the spindle from any axial movement which might otherwise be produced by this cam and roller combination and permits the spindle to rotate freely by power through a suitable belt E driving the pulley 33'. This assembly and operation is illustrated in Figure 2 of the drawings. A closure ring 56 is provided to complete the assembly, this ring being of which the clamp screw 57 passes for tightening.

The assembly is compact, well balanced for all possible operations, and capable of a multiplicity of adjustments and replacements permitting substantial scope in possible operations obvious to one skilled in the art. The exclusive use of all modifications as come within the scope of the appended claims is contemplated.

I claim:

1. In a work holder for grinding machines, a base, a cylindrical housing supported by said base, a spindle axially positioned in said housing, bearings interposed between said spindle and housing whereby said spindle is capable of rotatable and axial movement, a spring in said housing normally urging said spindle in one direction, a cam and a cam follower carried by the housing and spindle individually and operable to shift said spindle during rotation against the tension of said spring, means threaded on said spindle and engaging said housing for shifting the former to render said cam inoperative, and a chuck carried by said spindle.

2. In a device of the character described, a base, main and auxiliary cylindrical housings supported by said base, a rotatable spindle having its intermediate portion enclosed by said housings, spaced bearings interposed between said spindle and the main housing, said bearings including outer raceways fixed in said housing and inner raceways slidable on said spindle, a spring engaging one of said raceways and tensioned to position said spindle with respect to said housing, a cam carried by said spindle and enclosed in said auxiliary housing, a bearing surface carried by the main housing and engaging said cam to cause axial movement of the spindle against said spring tension, a hand wheel threaded on said spindle for shifting said spindle relative to said housings to cause engagement and disengagement between said cam and said bearing portion, said last-named means being positioned rearward of the auxiliary housing and comprising a hand wheel threaded on said spindle, a drive pulley for said spindle, and a work engaging chuck.

3. In a device of the character described, a base, a housing supported by said base, a rotatable spindle having a drive wheel and having its intermediate portion enclosed by said housing, a cam carried by said spindle within said housing, a cam follower mounted on said housing adjacent said cam, spaced bearings interposed between said spindle and said housing and slidably receiving said spindle, a spring stressed between said housing and said spindle and normally urging said cam against said follower so as to produce axial movements of said spindle during rotation thereof by said drive wheel, a work-holding chuck on one end of said spindle, and a hand wheel threaded on the other end of said spindle engageable with said housing for shifting the same axially relative to said spindle to disengage said cam and said follower.

4. The substance of claim 3 further including an end thrust roller bearing interposed between said hand wheel and housing.

5. In a device of the character described, a base, main and auxiliary cylindrical housings supported by said base, a rotatable spindle having its intermediate portion enclosed by said housings, spaced bearings interposed between said spindle and the main housing, said bearings including outer raceways fixed in said housing and inner raceways slidable on said spindle, a spring engaging one of said raceways and tensioned to position said spindle with respect to said housing, a cam carried by said spindle and enclosed in said auxiliary housing, a bearing surface carried by the main housing and engaging said cam to cause axial movement of the spindle against said spring tension, means for shifting said spindle relative to said housings to cause engagement and disengagement between said cam and said bearing portion, said last-named means being positioned rearward of the auxiliary housing and including a hand wheel threaded on said spindle and a freely rotatable bearing element in contact with said housing, a drive pulley for said spindle, and a work engaging chuck.

PAUL H. WALTHER.

REFERENCES CITED

The following references are of record in the file of this patent:

UNITED STATES PATENTS

| Number | Name | Date |
|---|---|---|
| 1,323,452 | Cogsdill | Dec. 2, 1919 |
| 1,584,717 | Belden et al. | May 18, 1926 |
| 1,806,562 | Pichler | May 19, 1931 |
| 1,849,868 | Einstein | Mar. 15, 1932 |
| 2,099,724 | Cogsdill | Nov. 23, 1937 |
| 2,342,889 | Polson | Feb. 29, 1944 |

FOREIGN PATENTS

| Number | Country | Date |
|---|---|---|
| 26,452 | Great Britain | Nov. 25, 1911 |
| 385,746 | Great Britain | Jan. 5, 1933 |